(12) United States Patent
Pastena et al.

(10) Patent No.: US 11,345,769 B2
(45) Date of Patent: May 31, 2022

(54) HYDROPHOBIC, LOW GLASS TRANSITION TEMPERATURE OLIGOMER WITH HIGH LEVEL OF CHAIN TRANSFER AGENT

(71) Applicant: Columbia Insurance Company, Omaha, NE (US)

(72) Inventors: Gianna Pastena, Flanders, NJ (US); Brian Munoz, Union, NJ (US); Hrire Gharapetian, Ridgewood, NJ (US); Thomas Penny, Newton, NJ (US)

(73) Assignee: Columbia Insurance Company, Omaha, NE (US)

( * ) Notice: Subject to any disclaimer, the term of this patent is extended or adjusted under 35 U.S.C. 154(b) by 162 days.

(21) Appl. No.: 16/923,237

(22) Filed: Jul. 8, 2020

(65) Prior Publication Data

US 2021/0198398 A1    Jul. 1, 2021

Related U.S. Application Data

(60) Provisional application No. 62/954,906, filed on Dec. 30, 2019.

(51) Int. Cl.
| | |
|---|---|
| *C08F 220/06* | (2006.01) |
| *C09D 7/65* | (2018.01) |
| *C08K 3/04* | (2006.01) |
| *C08K 3/22* | (2006.01) |
| *C08K 3/28* | (2006.01) |

(52) U.S. Cl.
CPC .............. *C08F 220/06* (2013.01); *C08K 3/04* (2013.01); *C08K 3/22* (2013.01); *C08K 3/28* (2013.01); *C09D 7/65* (2018.01); *C08K 2003/2265* (2013.01)

(58) Field of Classification Search
CPC ........... C08F 220/06; C09D 7/65; C08K 3/04; C08K 3/22; C08K 3/28; C08K 2003/2265
USPC ........................................................ 524/413
See application file for complete search history.

(56) References Cited

U.S. PATENT DOCUMENTS

| | | | |
|---|---|---|---|
| 4,593,081 A | 6/1986 | Bobsein et al. | |
| 5,095,088 A | 3/1992 | Wang | |
| 5,684,101 A | 11/1997 | Muir et al. | |
| 5,859,112 A | 1/1999 | Overbeck et al. | |
| 5,990,202 A | 11/1999 | Nguyen et al. | |
| 6,391,992 B1 | 5/2002 | Pinschmidt, Jr. et al. | |
| 7,256,226 B2 | 8/2007 | Kuo et al. | |
| 7,402,627 B2 | 7/2008 | Yang et al. | |
| 7,642,314 B2 | 1/2010 | Gharapetian et al. | |
| 7,695,770 B2 | 4/2010 | Dombrowski | |
| 7,750,074 B2 | 7/2010 | Yang et al. | |
| 9,109,068 B2 | 8/2015 | Rodrigues et al. | |
| 9,139,676 B2 | 9/2015 | Yang et al. | |
| 9,815,961 B2 | 11/2017 | Yang et al. | |
| 9,994,722 B2 | 6/2018 | Sheerin et al. | |
| 2004/0003908 A1 | 1/2004 | Singh et al. | |
| 2004/0019141 A1* | 1/2004 | Bastelberger | C08K 5/101 524/261 |
| 2015/0000554 A1 | 1/2015 | Nabuurs et al. | |
| 2016/0333199 A1* | 11/2016 | Akkerman | C08F 220/1802 |
| 2018/0118956 A1* | 5/2018 | Raghavanpillai | C09D 7/65 |
| 2020/0299433 A1 | 9/2020 | Chen et al. | |

OTHER PUBLICATIONS

Ludmila I. Ronco et al. "Emulsion Polymerisation of MMA Employing a Chain Transfer Agent of Low Environmental Impact: ISO-OCTYL-3-Mercaptopropionate." The Canadian Journal of Chemical Engineering. col. 91, Apr. 2013.
International Search Report and Written Opinion issued in connection with the corresponding International Application No. PCT/US2020/063918 dated Mar. 17, 2021.

* cited by examiner

*Primary Examiner* — Kelechi C Egwim
(74) *Attorney, Agent, or Firm* — The H.T. Than Law Group

(57) ABSTRACT

Disclosed herein is an additive for a paint or stain composition or for a colorant composition. The additive is polymerized from at least one acrylate monomer and a chain transfer agent. The additive has a weight molecular weight from about 2,000 Daltons to about 5,000 Daltons, and the chain transfer agent comprises a hydrogen-sulfur functionality and is present from about 8 to about 20 parts per hundred parts of monomers. The additive's glass transition temperature ranges from about −50° C. to about −10° C. and the additive is hydrophobic. The additive is added to the colorant composition to minimize tip drying at the colorant canisters, and is added to paint or stain composition as an open time extender.

20 Claims, No Drawings

HYDROPHOBIC, LOW GLASS TRANSITION TEMPERATURE OLIGOMER WITH HIGH LEVEL OF CHAIN TRANSFER AGENT

FIELD OF THE INVENTION

The present invention is directed to hydrophobic oligomers that when added to colorant compositions can reduce the incidents of clogging at the colorant canisters' tip. The present invention is also directed to hydrophobic oligomers that can be added to paint and stain compositions as an open time additive and do not adversely affect the qualities of the paint or stain films.

BACKGROUND OF THE INVENTION

Most of the tintable base paints manufactured at the factories are shipped to the paint stores without colorants. When consumers purchase the paints and select the paint colors, multiple colorant compositions, known as the color primaries, are added to and mixed with the tintable paints to achieve the final paint colors. Commonly owned U.S. Pat. No. 9,994,722 to Sheerin et al describes the process of tinting or coloring the tintable base paints with colorant compositions at the points-of-sale and is incorporated herein by reference in its entirety. Many tintable base paints contain opacifying pigments, except for the deep or 4-base tintable paints which has little or no opacifying pigment, as discussed in Sheerin et al. Commonly owned U.S. Pat. Nos. 7,402,627, 7,750,074, 9,139,676 and 9,815,961 to Yong et al describe high-end water-based colorants and are incorporated herein by reference in their entireties.

The colorant compositions are typically stored in canisters ready to be dispensed into the tintable based paints. One drawback of maintaining colorant canisters is having to regularly clean the dispensing tips of the canisters, since colorants may dry and partially or fully block the canister tips. Fully blocked canister tips prevent the dispensing of the colorants, and partially blocked canister tips would prevent the dispensing of the correct amounts of individual colorants to mix the correct paint colors.

A conventional solution is to add a humectant, e.g., a hydrophilic additive, such as polyethylene glycol, such as PEG400, to the colorant to maintain the fluidity of the colorant compositions within the colorant canisters. While retaining moisture, such hydrophilic additives can cause water sensitivity of the dry paint films thereby causing undesirable surfactant leaching, which leaves unsightly albeit washable streaks on paint films.

Hence, there remains a need to maintain the tips of the colorant canisters open to allow unobstructed dispensing of colorants without negatively affecting the properties of the paint films.

SUMMARY OF THE INVENTION

An embodiment of the present invention is directed to a novel humectant and unlike the conventional humectants, the inventive humectant is hydrophobic and are preferably oligomers or low molecular weight polymers. Preferably, the inventive humectant also has a low glass transition temperature (Tg), such that the inventive humectant remains in a liquid or viscous phase within the temperature ranges relevant for the application of paints and stains to walls or floors and for dry paint and stain films.

In another embodiment, the inventive humectant utilizes a relatively high amount of chain transfer agent to maintain low molecular weight. In another embodiment, the amount of chain transfer agent used is significantly higher than the levels heretofore used or experimented in polymerization to control molecular weights. Suitable chain transfer agents include but are not limited to monofunctional mercaptans such as monothiols or compounds having a sulfur-hydrogen (S—H) functionality, such as the preferred isooctyl 3-mercaptopropionate (iOMP) and n-dodecyl mercaptan (n-DDM), among others described below.

An embodiment of the present invention relates to an additive for a paint or stain composition or for a colorant composition. The additive is polymerized from at least one acrylate monomer and a chain transfer agent. The additive preferably has a weight average molecular weight (Mw) from about 2,000 Daltons to about 5,000 Daltons, preferably from about 2,500 Daltons to about 4,000 Daltons. The chain transfer agent preferably comprises a hydrogen-sulfur (H—S) functionality and is present from about 8 to about 20 parts per hundred parts of monomers (phr), preferably from about 9 to about 17 phr, more preferably from about 9.5 to about 15 phr. The additive's glass transition temperature ranges from about −50° C. to about −10° C., preferably from about −40° C. to about −20° C. The additive is hydrophobic.

Preferably, the at least one acrylate monomer comprises a principal acrylate monomer, and the principal acrylate monomer comprises at least 50 wt. % of all monomers, preferably at least 60 wt. %, preferably at least 70 wt. %, preferably at least 75 wt. %, and the at least one acrylate monomer preferably has a solubility in water of less than 5 g/l, preferably less than 4 g/l or preferably less than 3 g/l at 20° C. to 30° C. In one example, the principal monomer is butyl acrylate (BA). In another example, the principal monomer is 2-ethylhexyl acrylate (2-EHA). In another example, the at least one acrylate monomer comprises at least both BA and 2-EHA.

Preferably, the additive is added to a colorant composition in a range from about 6 wt. % to about 30 wt. %, preferably from about 8 wt. % to about 27.5 wt. %, preferably from 9 wt. % to about 25 wt. %. The colorant composition further comprises a color pigment.

Preferably, the additive is added to a paint or stain composition in a range from about 1.13 wt. % to about 4.53 wt. % of the inventive hydrophobic oligomer solids to paint solids, more preferably from about 1.7 wt. % to about 2.83 wt. % of the inventive hydrophobic oligomer solids to paint solids. The paint or stain composition further comprises a film forming resin and an optional opacifying pigment. As used herein, the opacifying pigment functions to hide the surface covered by the paint or stain composition and includes titanium dioxide. As used herein, the opacifying pigment is different than color pigments which tint or color tintable paint or stain compositions.

These and other objects of the present invention are realized by the claims below, and various embodiments and aspects of the present invention are described in the Detailed Description and by the claims below.

DETAILED DESCRIPTION OF THE PREFERRED EMBODIMENTS

In accordance with an aspect of the present invention, the present inventors have discovered a hydrophobic oligomer made with a high amount of chain transfer agent from about 8 to about 20 phr of the total monomer weight (parts per hundred parts of monomer/rubber) of a chain transfer agent, preferably iOMP or n-DDM, a Tg of lower than about −10° C. and higher than about −50° C., such that the hydrophobic oligomer remains in the liquid or viscous phase within the relevant temperature ranges for paints and stains. The weight average molecular weight (Mw) of the inventive oligomer is preferably from about 2,000 Daltons to about 5,000 Daltons.

Preferably, the amount of chain transfer agent can range from about 9 to about 17 phr and preferably from about 9.5 to about 15 phr. Preferably, the weight molecular weight of the inventive hydrophobic oligomer may range from about 2,500 Daltons to about 4,000 Daltons. Preferably, the Tg of the inventive hydrophobic oligomer may range from about −50° C. to about −10° C. or preferably from about −40° C. to about −20° C. Preferably, the hydrophobicity of the inventive oligomer is illustrated by the monomers' solubility in water, as discussed below.

The inventive hydrophobic oligomer is preferably polymerized and more preferably polymerized by emulsion polymerization, from principally acrylic monomers and more preferably from at least one "principal acrylic monomer," such as butyl acrylate monomers (BA) or 2-ethylhexyl acrylate (2-EHA), that also have low solubility in water to ensure the oligomer's hydrophobicity. As used herein, a principal acrylic monomer makes up at least about 50 wt. % of the total monomer, preferably at least about 60 wt. %, or at least about 70 wt. % or at least about 75 wt. %.

Other suitable low Tg and low solubility acrylic monomers include but are not limited to 2-ethoxyethyl acrylate (Tg=−50° C.), 2-methoxyethyl acrylate (Tg=−50° C.) and octadecyl methacrylate (Tg=−100 C; sol. 1 µg/l @ 25 C).

So long as the resulting oligomers are hydrophobic and has Tgs within the stated range, "other acrylic monomers" and "other monomers" may also be included in the inventive hydrophobic oligomer. Suitable other acrylic monomers may include methyl methacrylate (MMA) and methacrylic acid (MAA). Suitable other monomers may include vinyl or styrene. Latexes made principally from acrylic monomers are preferred for the present invention, although the inclusion of other non-acrylic monomers are within the scope of the present invention.

Any acrylic monomers can be used as the other acrylic monomers. Any (meth)acrylic monomers can be used in the present invention. Suitable (meth)acrylic monomers include, but are not limited to methyl (meth)acrylate, ethyl (meth)acrylate, butyl (meth)acrylate, iso-octyl (meth)acrylate, lauryl (meth)acrylate, 2-ethylhexyl (meth)acrylate, stearyl (meth)acrylate, isobornyl (meth)acrylate, methoxyethyl (meth)acrylate, 2-ethyoxyethyl (meth)acrylate, 2-hydroxyethyl (meth)acrylate, 2-hydroxybutyl (meth)acrylate, dimethylamino ethyl (meth)acrylate, diethylaminoethyl (meth)acrylate, dimethylaminopropyl (meth)acrylamide, alkyl (meth)acrylic acids, such as methyl (meth)acrylate acids, (meth)acrylic acids, wet adhesion monomers, such as N-(2-methacryloyloxyethyl)ethylene urea, and multifunctional monomers such as divinyl benzene, diacrylates, for cross-linking functions etc., acrylic acids, ionic acrylate salts, alkacrylic acids, ionic alkacrylate salts, haloacrylic acids, ionic haloacrylate salts, acrylamides, alkacrylamides, monoalkyl acrylamides, monoalkyl alkacrylamides, alkyl acrylates, alkyl alkacrylates, acrylonitrile, alkacrylonitriles, dialkyl acrylamides, dialkyl alkacrylamides, hydroxyalkyl acrylates, hydroxyalkyl alkacrylates, only partially esterified acrylate esters of alkylene glycols, only partially esterified acrylate esters of non-polymeric polyhydroxy compounds like glycerol, only partially esterified acrylate esters of polymeric polyhydroxy compounds, itaconic acid, itaconic mono and di-esters, and combinations thereof. The preferred alkyl (meth)acrylate monomers are methyl methacrylate and butyl acrylate.

Preferred other monomers or other non-acrylic monomers include monomers containing aromatic groups, such as styrene and α-methylstyrene. Other suitable monomers containing aromatic groups include, but are not limited to, 2,4-diphenyl-4-methyl-1-pentene, 2,4-dimethylstyrene, 2,4,6-trimethylstyrene, 2,3,4,5,6-pentafluorostyrene, (vinylbenzyl)trimethylammonium chloride, 2,6-dichlorostyrene, 2-fluorostyrene, 2-isopropenylaniline, 3(trifluoromethyl)styrene, 3-fluorostyrene, α-methylstyrene, 3-vinylbenzoic acid, 4-vinylbenzyl chloride, α-bromostyrene, 9-vinylanthracene, and combinations thereof.

Preferred other monomers containing primary amide groups are (meth)acrylamides. Suitable monomers containing amide groups include, but are not limited to, N-vinylformamide, or any vinyl amide, N,N-dimethyl(meth)acrylamide, N-(1,1-dimethyl-3-oxobutyl)(meth)acrylamide, N-(hydroxymethyl)(meth)acrylamide, N-(3-methoxypropyl)(meth)acrylamide, N-(butoxymethyl)(meth)acrylamide, N-(isobutoxymethyl)acryl(meth)acrylamide, N-[tris(hydroxymethyl)methyl]acryl(meth)acrylamide, 7-[4-(trifluoromethyl)coumarin](meth)acrylamide, 3-(3-fluorophenyl)-2-propenamide, 3-(4-methylphenyl)(meth)acrylamide, N-(tert-butyl)(meth)acrylamide, and combinations thereof. These monomers can be polymerized with acrylic monomers, listed above. General formula for vinyl(form)amides are:

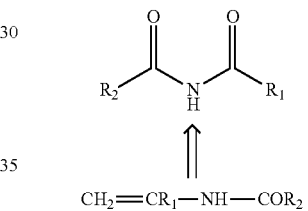

and (meth)acrylamides:

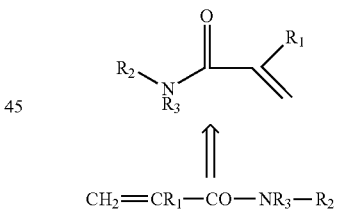

where $R_1$ and $R_2$ can be —H, —$CH_3$, —$CH_2CH_3$, and other substituted organic functional groups and $R_3$ can by —H, an alkyl or an aryl.

In one embodiment, the other monomers may also include vinyl monomers. Monomers of this type suitable for use in accordance with the present invention include any compounds having vinyl functionality, i.e., —CH=$CH_2$ group. Preferably, the vinyl monomers are selected from the group consisting of vinyl esters, vinyl aromatic hydrocarbons, vinyl aliphatic hydrocarbons, vinyl alkyl ethers and mixtures thereof.

Suitable vinyl monomers include vinyl esters, such as, for example, vinyl acetate (VA), vinyl propionate, vinyl laurate, vinyl pivalate, vinyl nonanoate, vinyl decanoate, vinyl neodecanoate, vinyl butyrates, vinyl caproate, vinyl benzoates, vinyl isopropyl acetates and similar vinyl esters; nitrile monomers, such (meth)acrylonitrile and the like; vinyl aromatic hydrocarbons, such as, for example, styrene, methyl styrenes and similar lower alkyl styrenes, chlorostyrene, vinyl toluene, vinyl naphthalene and divinyl benzene; vinyl aliphatic hydrocarbon monomers, such as, for example, vinyl chloride and vinylidene chloride as well as alpha olefins such as, for example, ethylene, propylene, isobutylene, as well as conjugated dienes such as 1,3-butadiene, methyl-2-butadiene, 1,3-piperylene, 2,3-dimethyl butadiene, isoprene, cyclohexene, cyclopentadiene, and dicyclopentadiene; and vinyl alkyl ethers, such as, for example, methyl vinyl ether, isopropyl vinyl ether, n-butyl vinyl ether, and isobutyl vinyl ether.

A polymerizable glycol, such as methoxy polyethylene glycol (MPEG) or polypropylene glycol methyl ether may also be polymerized with the other monomers. A preferred polymerizable glycol is MPEG 750, which has 17 units of ethylene oxide (EO) side chains. MPEG with different EO chain lengths can also be used, MPEG 250, MPEG 350, MPEG 500, MPEG 1000, MPEG 3000, etc. The glycol is polymerized to prevent the hydrophilic PEG compound from leaching out of the paint film, e.g., when the film is wetted.

Suitable chain transfer agents include but are not limited to monofunctional mercaptans such as monothiols or compounds having a sulfur-hydrogen (S—H) functionality. A preferred chain transfer agent is isooctyl 3-mercaptopropionate (iOMP), disclosed in commonly owned U.S. Pat. No. 7,642,314 to Gharapetian et al. The preferred iOMP ($C_{11}H_{22}O_2S$) chain transfer agent has the following structure:

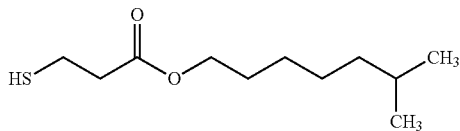

Other suitable mercaptan chain transfer include but are not limited to n-dodecyl mercaptan (n-DDM), t-dodecyl mercaptan, n-octyl mercaptan, t-octyl mercaptan, sec-octyl mercaptan, n-tetradecyl mercaptan, n-octadecyl mercaptan, n-hexyl mercaptan, n-amyl mercaptan, n-butyl mercaptan, t-butyl mercaptan, n-butyl 3-mercaptopropionate (BMP), methyl 3-mercaptopropionate, and the like, as well as mixtures thereof, disclosed in U.S. Pat. Nos. 4,593,081 and 7,256,226. The '081 patent further discloses other non-mercaptan chain transfer agents. All patent references cited in this paragraph are incorporated herein by reference in their entireties. n-DDM is another preferred chain transfer agent.

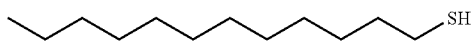

Additives including surfactants, initiators, chaser solutions, biocides, rheological modifiers, etc., can be added to the polymerization process.

Examples of surfactants useful in the polymerization process may include, but are not limited to, nonionic and/or anionic surfactants such as ammonium nonoxynol-4 sulfate, nonylphenol (10) ethoxylate, nonylphenol (~10 mol %) ethoxylate, nonylphenol (~40 mol %) ethoxylate, octylphenol (~40 mol %) ethoxylate, octylphenol (9-10) ethoxylate, sodium dodecyl sulfonate, sodium tetradecyl sulfonate, sodium hexadecyl sulfonate, polyether phosphate esters, alcohol ethoxylate phosphate esters, those compounds sold under the tradename Triton™ (e.g., QS series, CF series, X series, and the like), those compounds sold under the tradename Rhodapon™, those sold under the tradename Rhodapex™, those compounds sold under the tradename Rhodacal™, those compounds sold under the tradename Rhodafac™, and the like, and combinations thereof.

Examples of initiators and chaser solutions useful in the polymerization process may include, but are not limited to, ammonium persulfate, sodium persulfate (SPS), azo initiators such as azoisobutyronitrile, redox systems such as sodium hydroxymethanesulfinate (sodium formaldehyde sulfoxylate; reducer) and t-butyl-hydroperoxide (oxidizer), and the like, and combinations thereof, typically in an aqueous solution. Either or both of these components can optionally contain an additional surfactant and/or a pH adjuster, if desired to stabilize the emulsion.

Examples of pH adjusters useful in the polymerization process may include, but are not limited to, ammonium hydroxide, sodium hydroxide, sodium carbonate, sodium bicarbonate, potassium hydroxide, potassium carbonate, potassium bicarbonate, ammonia, amines such as trimethylamine, triethylamine, dimethylaminoethanol, diethylaminoethanol, AMP-95 and the like, and combinations thereof. In certain cases, compounds that qualify as pH adjusters can be added for purposes other than adjusting pH, e.g., emulsion stabilization, and yet are still characterized herein as pH adjusters.

Preferably, the latex emulsion polymers are chased with a redox (reducing agent and oxidation agent) pair to reduce the odor and to neutralize the unreacted monomers without performing the lengthy or time-consuming stripping step and requiring additional stripping equipment.

Suitable oxidizing agents include but are not limited to water-soluble hydroperoxides, tertiary butyl hydroperoxide, cumene hydroperoxide, hydrogen peroxide, sodium peroxide, potassium peroxide, sodium perborate, potassium persulfate, sodium persulfate, ammonium persulfate, persulfuric acid and salts thereof, perphosphoric acid and salts thereof, potassium permanganate, and an ammonium or alkali salt of peroxydisulfuric acid. A preferred oxidizing agent is tertiary butyl hydroperoxide (tBHP).

Suitable reducing agents include but are not limited to sodium formaldehyde sulfoxylate (SFS), ascorbic acid, isoascorbic acid, organic compounds containing thiol or disulfide groups, reducing inorganic alkali and ammonium salts of sulfur-containing acids, such as sodium sulfite, disulfite, thiosulfate, hydrosulfite, sulfide, hydrosulfide or dithionite, formadinesulfinic acid, hydroxymethanesulfonic acid, acetone bisulfite, amines, such as ethanolamine, glycolic acid, glyoxylic acid hydrate, lactic acid, glyceric acid, malic acid and tartaric acid. A preferred reducing agent is a formaldehyde-free SFS.

The following non-limiting Example 1 illustrates an emulsion polymerization of the inventive hydrophobic oligomer humectant. A monomer pre-emulsion was prepared, while the deionized water (DI) in a reactor was heated to 80° C. 36 grams of seed and a first initiator were charged to the reactor at 80° C., and held for 15 minutes. The monomer pre-emulsion feed was added to the reactor and then the second or delay initiator was added to the reactor over 3 hours, then held 30 minutes. The content of the reactor was cooled to 55° C., and then chased over 30 minutes. Thereafter, the content of the reactor was cooled to 35° C., before a pH adjustor (ammonia) and biocide were added. In this Example 1, the latex particles have a calculated Tg of −27° C.

The aggregated Tg of a co-polymer calculated by Fox's equation includes the individual Tg of various monomers being co-polymerized, as follows:

$$1/Tg_{agg} = Wf_1/Tg_1 + Wf_2/Tg_2 + Wf_x/Tg_x,$$

where $Tg_{agg}$ is the aggregated Tg of the co-polymer, $Wf_x$ is the weight fraction of each monomer x, $Tg_x$ is the Tg of a polymer made from the single monomer x, and x is the number of monomers in the co-polymer.

Tgs can also be measured by the differential scanning calorimetry (DSC) technique. Unless noted otherwise, Tgs used herein are calculated by Fox's Equation; all percentages are based on weight or wt. %; and all molecular weights are weight average molecular weights (Mw).

Example 1

| | total (g) | % solids | Amt. solids | |
|---|---|---|---|---|
| DI | 818 | 0% | 0 | |
| First initiator: | | | | |
| SPS | 2.0 | 100% | 2 | |
| DI | 40 | 0% | 0 | |
| Monomer pre-emulsion: | | | | |
| DI | 300 | 0% | 0 | |
| Surfactant | 33.8 | 25% | 8.45 | |
| MMA | 79.2 | 100% | 79.2 | 15.0% |
| BA | 422.4 | 100% | 422.4 | 80.0% |
| MAA | 26.4 | 100% | 26.4 | 5.0% |
| IOMP | 73.2 | 100% | 73.2 | 14 phr |
| Monomer delay initiator: | | | | |
| SPS | 2.0 | 100% | 2 | |
| DI | 30 | 0% | 0 | |
| DI rinse | 100 | 0% | 0 | |
| Chasers: | | | | |
| tBH | 1.5 | 100% | 1.5 | |
| DI | 18 | 0% | 0 | |
| FF SFS | 1.5 | 100% | 1.5 | |
| DI | 18 | 0% | 0 | |
| Post-adds | | | | |
| NH₃ | 19.0 | 28% | 5.32 | |
| DI | 20 | 0% | 0 | |
| Acticide | 3.8 | 100% | 3.8 | |
| DI | 3.8 | 0% | 0 | |

Total Latex:
total (g) 2013.00
total (g) solids 625.77
% solids = 31.09%
% surfactant = 1.60%
total active monomer (g) = 528.00

The total monomer weight was 528 grams. Hence, the 73.2 grams iOMP was about 14 phr (73.2÷528) (parts per hundred parts of monomers/rubber).

Several other Examples of the inventive hydrophobic oligomers were prepared using the emulsion polymerization technique of Example 1. The results are summarized below.

| Example | Mw (Daltons) | Viscosity (Pas) | Tg (° C.) | CTA (iOMP) (phr) | Monomers |
|---|---|---|---|---|---|
| 2 | 3477 | 36.00 | −27 | 10 | BA 80% MMA 15% MAA 5% |
| 3 | 3434 | 28.23 | −30 | 10 | BA 82.6% MMA 10.3% MAA 5.2% MPEG 1.9% |
| 4 | 2650 | 15.88 | −27 | 14 | BA 80% MMA 15% MAA 5% |
| 5 | 3638 | 19.47 | −30 | 10 | BA 83.0% MMA 14% MAA 1.5% MPEG 1.5% |
| 6 | 3790 | 21.98 | −27 | 10 | BA 80% MMA 18.5% MAA 1.5% |

As shown in Examples 1-6, higher levels of chain transfer agent, e.g., 14 phr, resulted in lower molecular weight, as expected. Due to the low glass transition temperatures, the hydrophobic oligomers are in the liquid or viscous stage at room temperature and for the relevant temperature ranges for indoor and outdoor aqueous paint compositions and for dry paint films, e.g., from about 10° C. (50° F.) to about 50° C. (122° F.). Their viscosities are measured and reported. Hence, the present inventors believe that the hydrophobic oligomers are non-film forming, and that in a paint film the hydrophobic oligomers associate with the latex particles through hydrophobic interactions. The inventive hydrophobic oligomers are compatible with the pigments and other particles in the colorant compositions.

Examples 1-4 contains higher amounts of MAA monomer, which is hydrophilic, as compared to Example 6, which contains a typical amount of MAA. Examples 3 and 5 also contain a small amount of hydrophilic MPEG monomer. Without being bound to any particular theory, the present inventors believe that some hydrophilicity was needed for better stabilization and association in the colorant compositions and in paint compositions. The oligomer latexes were still successful as an anti-tip drying additive, because the overall oligomers are still substantially hydrophobic and fluid, and can be used in colorant formulations in place of humectants due to its fluidic properties. Oligomers with lower hydrophilic monomers are preferred due to better resistance to surfactant leaching. Also, Examples 1 and 4 have similar monomer contents and Example 4 utilized more initiator. Also, without being bound to any particular theory, the present inventors believe that hydrophobic soft polymers or oligomers (with low Tg) provide the possibility of making soft and fluid polymers or oligomers and the ability to keep the oligomers fluid in the absence of water The monomer and chain transfer agent contents of Example 1, i.e., 14 phr, and with 80% BA, 15% MMA and 5% MAA, were repeated, as shown below. Examples 4, 7, 8, 9 and 10 utilized the same formulation, except that Examples 9 and 10 used less initiator. As shown below, there were no significant difference in molecular weight or viscosity and there were no significant differences in anti-tip drying performance. Hence, preferably lower amounts of initiator are preferred.

| Example | Mw (Daltons) | Viscosity (Pascals) |
| --- | --- | --- |
| 4 | 2650 | 15.88 |
| 7 | 2422 | 15.66 |
| 8 | 2465 | 15.73 |
| 9 | 2641 | 16.43 |
| 10 | 2654 | 15.86 |

The examples with 14 phr of iOMP have substantially similar properties and the results are repeatable, as well as the examples with 10 phr of iOMP. The inventive examples with 14 phr of iOMP have significantly lower Mw than those with 10 phr. Due to their similar monomer composition, viscosity and molecular weight, Examples 4 and 7-10 are considered as one group during performance testing. The molecular weight and viscosity results suggest that the effect of high-level chain transfer agent IOMP on the molecular weights of the oligomers may dominate the effect of changes in initiator concentration.

In Example 11, a higher amount of CTA, e.g., 20 phr, was included in the polymerization of monomers to show that higher CTA content is feasible and brings the molecular weight of the oligomer even lower. Example 12 has 14 phr of CTA and is a comparison for Example 11 for measuring molecular weight, as discussed below. The monomers that were polymerized include 80 wt. % BA, 15 wt. % MMA and 5 wt. % MAA. The CTA was iOMP.

| Example | CTA | Mw (Daltons) |
| --- | --- | --- |
| 11 | 20 phr | 2,081 |
| 12 | 14 phr | 2,982 |

The molecular weight of Example 11 at the higher CTA is within the preferred range of molecular weights of the inventive oligomer, stated above.

The molecular weights, which are weight average molecular weights, of the inventive hydrophobic oligomer were determined by a water's GPC instrument, equipped with refractive index and UV detectors using THF mobile phase. The viscosities were measured on dried samples of the examples after the water had evaporated leaving behind a substantially clear or transparent fluid at room temperature. Viscosities were measured with an Anton Paar Modular Compact Rheometer model MCR 302.

As utilized herein, solubility is an indication of the degree of hydrophilicity and hydrophobicity. Lower solubility indicates more hydrophobicity and higher solubility indicates more hydrophilicity. It is known that BA, EA and dodecyl methacrylate have low Tg and are hydrophobic. See "Mechanical Properties of Hydrophilic Copolymers of 2-Hydroxyethyl Methacrylate with Ethyl Acrylate, N-Butyl Acrylate, and Dodecyl Methacrylate," J Biomed Mater Res. 1983 September; 17(5):757-67 (available at www.ncbi.nlm.nih.gov/pubmed/6619175.)

While it is preferred that the principal acrylic monomer, e.g., BA or 2-EHA, should have low solubility, preferably less than about 5 g/l from 20° C. to 30° C., more preferably less than about 4 g/l, or less than about 3 g/l. There does not appear to be a consensus in the scientific literature of a temperature at which to measure solubility. Hence, the present invention takes into account the reported solubility values, which are summarized below along with calculated Tg values. It is noted that the resulting oligomer is preferably hydrophobic, more so than any one monomer.

| Monomer | Solubility in Water at T° | Tg (° C.) |
| --- | --- | --- |
| BA | 2 g/l at 23° C. | −54 |
| 2-EHA | 0.0096 g/l at 25° C. | −50 |
| EA | 15-20 g/l at 25° C. | −24 |
| MMA | 15 g/l at 30° C. | 105 |
| MAA | 89 g/l at 20° C. | 228 |
| Styrene | 0.3 g/l at 25° C. | 100 |
| VA | 20 g/l at 25° C. | 30 |
| iOMP | <0.00767 g/l at 20° C. | n/a |
| DMA | 1 µg/l at 25° C. | −65 |

(DMA is dodecyl methacrylate, also known as lauryl methacrylate, preferably long chain ($C_{12}$ and $C_{13}$).) Solubility information was obtained from https://www.ncbi.nlm.nih.gov/pccompound and https://echa.europa.eu/. Tg information was obtained from https://www3.nd.edu/~hgao/thermal_transitions_of_homopolymers.pdf, or from http://www.wernerblank.com/equat/Fox_equation15.htm. The freezing point of iOMP is about −10° C. (see https://www.chemicalbook.com/ProductChemicalPropertiesCB2757359_EN.htm).

A set of experiments was conducted with aqueous colorant compositions described in commonly owned U.S. Pat. Nos. 7,402,627, 7,750,074, 9,139,676 and 9,815,961 to Yong et al mentioned above. The experiments were conducted with inorganic colorants, e.g., red oxide colorant, and organic colorants, e.g., carbon black colorant and phthalocyanine blue. These colorant compositions have polyethylene glycol (PEG) added thereto as a hydrophilic humectant. PEG is a liquid at the relevant temperature ranges and is highly soluble in water (256 g/l at 25° C.). PEG is substituted with the inventive hydrophobic humectants from Examples 2-6 at a weight ratio of 1:1. Red oxide, carbon black and phthalocyanine blue colorant compositions were tested. About 20 wt. % of the inventive hydrophobic oligomer was added to the red oxide and phthalocyanine blue colorant compositions, and about 10 wt. % was added to the carbon black colorant composition. Preferably, the inventive hydrophobic oligomer is added from about 6 wt. % to about 30 wt. % of the colorant composition, preferably from about 8 wt. % to about 27.5 wt. % or from about 9 wt. % to about 25 wt. %.

As used herein, colorant compositions are not paint or stain compositions. Colorant compositions are mixed into tintable paint or stain compositions at the points of sale to tint the paints and stains. Colorant compositions may comprise a small amount of binder and this binder is insufficient to form a film or a matrix that encapsulates the pigments contained in the colorant compositions.

Tip Drying Experiment. The inventive hydrophobic oligomer was evaluated for this effectiveness as an anti-tip drying agent. The tips of pipettes having a volume of 7 ml was cut to a diameter of about 3 mm to simulate the tips of colorant canisters on a tinting machine. Colorant compositions were loaded into these pipettes, and the pipettes were left undisturbed for a predetermined time period, i.e., 16 hours in this experiment. After the predetermined time period has passed, colorant samples were dispensed from the cut-end of the pipette. A rating system was designed to quantify the anti-tip drying effectiveness, as follows:

| Rating | Description |
| --- | --- |
| 0 | Fail-completely blocked |
| 1 | Maximum pressure |
| 2 | High pressure |
| 3 | Some pressure |
| 4 | Minimum pressure |
| 5 | No blocking |

Ratings from 1-4 may include some angular dispensing.

| Red oxide inorganic colorant composition - pipette tip experiments | | | | | | |
| --- | --- | --- | --- | --- | --- | --- |
|  | conventional | Ex. 2 | Ex. 3 | Ex. 4 | Ex. 5 | Ex. 6 |
| Trial 1 | 3 | 5 | 2 | 5 | 5 | 5 |
| Trial 2 | 3 | 2 | 5 | 5 | 5 | 5 |
| Avg. | 3 | 3.5 | 3.5 | 5 | 5 | 5 |

The results show that the inventive hydrophobic oligomer performs consistently better than the conventional PEG hydrophilic humectant in anti-tip drying effectiveness.

Colorant Drying Experiment. Another experiment was conducted to test the drying characteristics of the colorant compositions on a substrate. 10-mil (10 thousandth of 1 inch) drawdowns of the colorant compositions were made on white scrub cards. At different time intervals, a line of sand was applied across the film. This process was continued until the colorant compositions dried and the sand no longer adhered to the colorants.

| Red oxide inorganic colorant composition - sand trail experiments | | | | | | |
| --- | --- | --- | --- | --- | --- | --- |
|  | conventional | Ex. 2 | Ex. 3 | Ex. 4 | Ex. 5 | Ex. 6 |
| Trial 1 | 66 min. | 75 min. | 75 min. | 76 min. | 76 min. | 72 min. |

The results show that the inventive hydrophobic oligomer humectant performed better than the PEG hydrophilic humectant by significant amount of time for the red oxide inorganic colorant.

| Carbon black organic composition - sand trail experiments | | |
| --- | --- | --- |
|  | conventional | Ex. 2 |
| Trial 1 | 81 min. | 78 min. |

| Phthalocyanine blue organic composition sand trial experiments | | | |
| --- | --- | --- | --- |
|  | PEG | Example 2 | Example 4 |
| Trial 1 | 55 min | 60 min | 60 min |

The results show that the inventive hydrophobic oligomer humectant when used with organic colorants performs comparable to the PEG hydrophilic humectant. The present inventors believe that the relative low amount of the inventive hydrophobic oligomer used (10 wt. % at 10 phr) did not sufficiently improve the open time over the conventional hydrophilic PEG, and that carbon black organic colorant have smaller pigment particles resulting in lower total solids in the colorant and requiring less humectant. On the other hand, red oxide inorganic colorant has larger pigment particles resulting in higher total solids in the colorant and requiring more humectant.

Canister Tip Experiment at Point-of-Sale. Red oxide colorant compositions were loaded into point-of-sale manual carrousel dispensers. PEG humectant and inventive Example 4 (14 phr of CTA) were added to the colorant compositions. One fluid ounce of colorant was dispensed after a predetermined time of inactivity as elapsed. After 48 hours of inactivity, the colorant composition with PEG humectant dried up and blocked the nozzle. After 48 hours of inactivity, the colorant composition with the inventive Example 4 remained fluid and did not dry, leading to an easy cleaning of the dispenser.

Color Transfer Experiment. Another set of experiments was conducted wherein the colorant compositions with the conventional PEG humectant and with the inventive hydrophobic oligomer were added to tint a commercial premium flat 3-base paint composition. Paint bases are discussed in commonly owned U.S. Pat. No. 9,994,722, which is incorporated herein by reference in its entirety. These experiments were conducted to compare the properties, such as color transfer and surfactant leaching, of the paint films.

Color transfer (or color rub-off) for paints tinted with colorants of red oxide were measured on 3-mil draw down dried for 7 days. This test involves the use of a water-damp piece of white felt which is weighted down and slid across a dried tinted paint film. The felt rubs off and picks up color from the film. This test shows how hydrophilic or hydrophobic a paint film is. Hydrophilic films would generally transfer more color than a hydrophobic film. The difference between a clean white felt to the colored felt was measured with a spectrophotometer and the measurements are $\Delta E$ or change in colors or a color difference in CIE2000 units with lower values being the better resistance to color transfer.

| Red oxide inorganic colorant composition -color transfer experiments | | | | | | |
| --- | --- | --- | --- | --- | --- | --- |
| conventional | Ex. 2 | Ex. 3 | Ex. 4 | Ex. 5 | Ex. 6 |
| 3.08 | 1.61 | 2.38 | 2.45 | 2.76 | 2.28 |

| Carbon black organic colorant composition -color transfer experiments | |
| --- | --- |
| conventional | Ex. 4 |
| 0.58 | 1.03 |

The results show that paints with colorants used with the inventive hydrophobic oligomer resist color rub-off better than or comparable to the paints with colorants used with conventional PEG humectant.

Surfactant Leaching Experiment. This test determines whether surfactants or other water-soluble materials can leach from a paint film to cause a blotchy appearance or tan or brown spots to appear on the paint film when certain environmental conditions exist. Surfactant leaching is a test for probing the extent of exterior water spotting on a coating. The test method for surfactant leaching involved forming 3-mil draw down panels of each coating composition. These panels were then allowed to dry in air at about 72° F. and 50% RH for about 24 hours. Each panel was then held so that the coating on the substrate was oriented vertically, at which point 3-5 drops of water were applied over the coated area. Additionally, water is also sprayed on the panel. Without changing the orientation of the panels, the coatings were allowed to dry for 1 day and 7 days. The presence or absence of visible staining on each panel was noted and rated from 1 to 5, with 1 representing the most visible stain and with 5 representing no visible stain, for drops and sprays at 1 day and at 7 days. The maximum rating is 20.

Paints with inorganic red oxide colorant composition

| Humectant | Drops | | Spray | | Total |
|---|---|---|---|---|---|
| | 1 day | 7 days | 1 day | 7 days | |
| PEG | 3 | 3 | 2 | 3 | 11 |
| Example 2 | 3 | 4 | 2 | 4 | 13 |
| Example 3 | 2 | 4 | 4 | 3 | 13 |
| Example 4 | 2 | 4 | 4 | 4 | 14 |
| Example 5 | 2 | 3.5 | 3 | 3.5 | 12 |
| Example 6 | 2 | 3 | 2 | 3 | 10 |

Paints with organic carbon black colorant composition

| Humectant | Drops | | Spray | | Total |
|---|---|---|---|---|---|
| | 1 day | 7 days | 1 day | 7 days | |
| PEG | 3 | 3 | 2 | 3 | 11 |
| Example 4 | 2 | 2 | 4 | 4 | 12 |

Paints with organic phthalocyanine blue colorant composition

| Humectant | Drops | | Spray | | Total |
|---|---|---|---|---|---|
| | 1 day | 7 days | 1 day | 7 days | |
| PEG | 2 | 3 | 2 | 2 | 9 |
| Example 2 | 2 | 4 | 3 | 3 | 12 |
| Example 4 | 2 | 4 | 3 | 3 | 12 |

The results show that the surfactant leaching was comparable between the conventional PEG humectant and the inventive hydrophobic oligomer being used as a humectant.

In accordance to another aspect of the present invention, the inventive hydrophobic oligomer is added directly to the paint compositions as an open time (OT) extender additive. A 7-mil draw down of a primer paint was made over a scrub panel. The primer was slightly tinted to make the endpoint visible After allowing the panel to dry overnight a 3-mil draw down of a flat finish paint was made over the dried primer film. The open time was measured with the AB3600 dry time recorder. The recorder had three probes measuring at a time and multiple panels were run.

The Open Time Experiment. About 30 lbs. of the inventive hydrophobic oligomer was added to 100 gallons of paint, which was about 1.7 wt. % of the inventive hydrophobic oligomer solids to paint solids or about 10 solid lbs. of the inventive hydrophobic oligomer in 100 gallons of paint, which had about 52% solids. This ratio/percentage is also generally used for commercial open time additive, such as Wonderwet®. Preferably, as an open time agent the inventive hydrophobic oligomer is added from about 20 lbs. to about 80 lbs. per 100 gallons of paints, more preferably from about 30 lbs. to about 50 lbs. per 100 gallons. The preferred ratios can also be stated as from about 1.13 wt. % to about 4.53 wt. % of the inventive hydrophobic oligomer solids to paint solids, more preferably from about 1.7 wt. % to about 2.83 wt. % of the inventive hydrophobic oligomer solids to paint solids.

In the table below, paint samples without any OT additive, paint samples with Inventive Example 10 added and paint samples with a commercial OT additive (Wonderwet®).

| Sample | Control with no OT | With inventive hydrophobic oligomer | With commercial OT additive |
|---|---|---|---|
| Panel 1 | 10.18 | 12.32 | 10.63 |
| Open | 10.23 | 12.45 | 10.85 |
| time (minutes) | 10.27 | | 10.07 |
| Panel 2 | 10.22 | 10.88 | 9.68 |
| Open | 10.20 | 11.97 | 10.72 |
| time (minutes) | 10.28 | 11.43 | 9.78 |
| Average | 10.23 | 11.81 | 10.85 |
| Deviation | 0.04 | 0.65 | 0.97 |

The paint with the inventive hydrophobic oligomer additive had one minute better open time than the paint with the commercial OT additive and 1.5 minutes better than the control paint.

Without being restricted to any particular theory, the present inventors believe that the anti-tip drying property and the improved OT property of the inventive non-film forming, low Tg, hydrophobic oligomer can be contributed to the fact that the inventive oligomer is not volatile like PEG and remains a liquid within the relevant operating temperature ranges thereby keeping the colorant compositions softer longer to provide better dispensability and OT. The present inventors also believe that the hydrophobicity and low Tg contribute to the open time and improved tip dispensability by maintaining the inventive oligomer in a liquid or gel state. The present inventors also believe that the hydrophobic and fluidic properties of the inventive oligomer can control of leachable materials in the paint film, such as non-reactive surfactants.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. An additive for a paint or stain composition or for a colorant composition, said additive is polymerized from at least one acrylate monomer and a chain transfer agent,
    wherein the additive has a weight average molecular weight (Mw) from about 2,000 Daltons to about 5,000 Daltons,
    wherein the chain transfer agent comprises a hydrogen-sulfur (H—S) functionality and is present from about 8 to about 20 parts per hundred parts of monomers (phr),
    wherein the additive's glass transition temperature ranges from about −50° C. to about −10° C.,
    wherein said additive is hydrophobic.

2. The additive of claim 1, wherein the additive has a weight average molecular weight (Mw) from about 2,500 Daltons to about 4,000 Daltons.

3. The additive of claim 1, wherein the chain transfer agent comprises isooctyl 3-mercaptopropionate.

4. The additive of claim 1, wherein the chain transfer agent comprises n-dodecyl mercaptan.

5. The additive of claim 1, wherein the chain transfer agent is present from about 9 phr to about 17 phr.

6. The additive of claim 5, wherein the chain transfer agent is present from about 9.5 to about 15 phr.

7. The additive of claim 1, wherein the additive's glass transition temperature ranges from about −40° C. to about −20° C.

8. The additive of claim 1, wherein the at least one acrylate monomer comprises a principal acrylate monomer, and the principal acrylate monomer comprises at least 50 wt. % of all monomers.

9. The additive of claim 8, wherein the principal acrylate monomer comprises at least 60 wt. % of all monomers.

10. The additive of claim 9, wherein the principal acrylate monomer comprises at least 70 wt. % of all monomers.

11. The additive of claim 10, wherein the principal acrylate monomer comprises at least 75 wt. % of all monomers.

12. The additive of claim 8, wherein the principal acrylate monomer has a solubility in water of less than 5 g/l at 20° C. to 30° C.

13. The additive of claim 12, wherein the principal acrylate monomer has a solubility in water of less than 4 g/l at 20° C. to 30° C.

14. The additive of claim 13, wherein the principal acrylate monomer has a solubility in water of less than 3 g/l at 20° C. to 30° C.

15. The additive of claim 8, wherein the principal monomer is butyl acrylate (BA).

16. The additive of claim 8, wherein the principal monomer is 2-ethylhexyl acrylate (2-EHA).

17. A colorant composition comprising a color pigment and the additive of claim 1, wherein the additive is added to the colorant composition in a range from about 6 wt. % to about 30 wt. %.

18. The colorant composition of claim 1, wherein the additive is added to the colorant composition in a range from about 8 wt. % to about 27.5 wt. %.

19. A paint or stain composition comprising a film forming resin, an optional opacifying pigment and the additive of claim 1, wherein the additive is added to the paint or stain composition in a range from about 1.13 wt. % to about 4.53 wt. % of the inventive hydrophobic oligomer solids to paint solids.

20. The paint or stain composition of claim 19, wherein the additive is added to the paint or stain composition in a range from about 1.7 wt. % to about 2.83 wt. % of the inventive hydrophobic oligomer solids to paint solids.

\* \* \* \* \*

UNITED STATES PATENT AND TRADEMARK OFFICE
CERTIFICATE OF CORRECTION

PATENT NO. : 11,345,769 B2
APPLICATION NO. : 16/923237
DATED : May 31, 2022
INVENTOR(S) : Pastena et al.

It is certified that error appears in the above-identified patent and that said Letters Patent is hereby corrected as shown below:

In the Claims

Column 16, Lines 9-11, should be corrected to read:
18. The colorant composition of claim 17, wherein the additive is added to the colorant composition in a range from about 8 wt. % to about 27.5 wt. %.

Signed and Sealed this
Twenty-seventh Day of September, 2022

Katherine Kelly Vidal
*Director of the United States Patent and Trademark Office*